United States Patent [19]
Ii

[11] Patent Number: 5,669,291
[45] Date of Patent: Sep. 23, 1997

[54] APPARATUS FOR SEPARATING WHEY FROM A SLURRY-LIKE MATERIAL

[76] Inventor: Kazuyoshi Ii, 4-3-28 Terakawa, Daitou City, Osaka, Japan

[21] Appl. No.: 628,078

[22] Filed: Apr. 8, 1996

[30] Foreign Application Priority Data

Apr. 6, 1995 [JP] Japan ............... 7-108209

[51] Int. Cl.⁶ ............... A01J 13/00; A01J 25/00; A23L 1/20; B30B 9/14
[52] U.S. Cl. ............... 99/459; 99/452; 99/456; 99/460; 99/465; 100/117; 100/145
[58] Field of Search ............... 99/452–465, 494, 99/516, 536; 100/117, 145; 366/79–90, 318–324

[56] References Cited

U.S. PATENT DOCUMENTS

| | | | |
|---|---|---|---|
| 1,747,300 | 2/1930 | Hildebrandt-Sorensen | 99/459 |
| 2,649,377 | 8/1953 | Wilsmann | 99/458 |
| 3,713,220 | 1/1973 | Kielsmeier et al. | 99/459 |
| 4,306,493 | 12/1981 | Hain et al. | 99/464 X |
| 4,509,413 | 4/1985 | Granberg et al. | 99/453 |
| 4,924,769 | 5/1990 | Lehmann et al. | 99/455 |
| 5,009,795 | 4/1991 | Eichler | 100/117 X |
| 5,118,427 | 6/1992 | Eichler | 100/117 X |
| 5,186,834 | 2/1993 | Arai | 100/117 X |
| 5,193,446 | 3/1993 | Olusczak et al. | 100/117 X |
| 5,301,605 | 4/1994 | Tomatis | 99/466 X |
| 5,417,155 | 5/1995 | Tatsuzawa et al. | 100/146 X |
| 5,419,251 | 5/1995 | Mantius et al. | 100/145 X |

FOREIGN PATENT DOCUMENTS 3004561  9/1994  Japan .

*Primary Examiner*—Timothy F. Simone
*Attorney, Agent, or Firm*—Evenson, McKeown, Edwards & Lenahan, P.L.L.C.

[57] ABSTRACT

An apparatus for separating whey from a slurry-like material such as bean and dairy products, includes a screen, a jacket mantling the screen with a first space outside the screen and a second space inside the screen, wherein the first space provides a whey chamber of a size which allows the screen to be submerged in the whey staying therein after the whey is squeezed through the screen, a spiral screw rotatively housed in the screen, the blades of the screw being kept in contact with the wall surface of the screen such that the whey is prevented from reversely flowing; and a take-out port provided in the jacket so as to allow the whey in the first chamber to overflow therethrough.

8 Claims, 5 Drawing Sheets

5,669,291

APPARATUS FOR SEPARATING WHEY FROM A SLURRY-LIKE MATERIAL

FIELD OF THE INVENTION

The present invention relates generally to an apparatus for separating whey form a slurry-like material, the apparatus being adapted for use in manufacturing "tofu" or soybean curd in Japan, and cheese in western countries, and more particularly to a pressing unit for obtaining whey for curds.

BACKGROUND OF THE INVENTION

"Tofu" or soybean curd is a traditional food for the Japanese people. It is produced from soybeans. A conventional method for producing tofu will be briefly described as the background.

Soybeans are first put into water for seven to eight hours in summer and twenty-four hours in winter. The soaked beans are ground by means of a stone grinder or a crusher, with the gradual addition of water. The soybeans become slurry-like. The slurry-like product is then pressed and milky bean whey is obtained, commonly called "soybean milk". The dehydrated residue is used as another food or cattle feed. The bean whey is then heated at a relatively low temperature, with the addition of water. The heated whey is poured into a tub with small holes all over its sides, lined with finely meshed cloth. A small amount of bittern is added, and the whey is pressed. The bittern serves to solidify the whey. Water content is removed through the holes of the tub. Thus tofu is made, and usually sliced into convenient sizes for sale.

In line with the advancement of mass-production the manufacturing process and apparatus are automated, and the present invention is directed to an automatic pressing unit for pressing the ground soybean to obtain bean whey for curd. A pressing unit in common use is provided with a screen having holes on its sides and a presser having a spiral screw coaxial with the screen. The bean whey is squeezed through the screen and received on a cylindrical jacket having a drain port. A typical example of this kind of pressing unit is disclosed in Japanese Utility Model Publication Reg. No. 3002561 which will be described.

The screw type pressing unit is more efficient than the filter type, but it is disadvantageous in that bubbles are brought into being by collision of the whey against the wall of the jacket when it is squeezed through the screen under pressure. The bubbles are detrimental to the quality of tofu. They remain in the bean whey, and are contained in a finished tofu. The bubbles contained in tofu produce a porous texture, thereby spoiling the palatal flavor and smoothness. Such defective torus are not suitable for a secondary cooking. For example, when they are fried in hot oil, the heat is prevented from prevailing through the tofu because of the porous structure thereof. This is accepted as the pores (bubbles) acting as insulators. When the oil is excessively heated, the bubbles expand to the extent that the shape of tofu is deformed. This spoils the appearance of the fried tofu.

SUMMARY OF THE INVENTION

Accordingly, the present invention is directed to prevent bubbles from occurring and being present in the whey during the process of pressing a slurry-like material, thereby preventing the formation of porous texture of the products.

According to the present invention, there is provided an apparatus for separating whey from a slurry-like material such as bean and dairy product, the apparatus including a screen, a jacket mantling or enveloping the screen with a first space outside the screen and a second space inside the screen, wherein the first space provides a whey chamber of a size which allows the screen to be submerged in the whey staying therein after the whey is squeezed through the screen, a spiral screw rotatively housed in the screen, the blades of the screw being kept in contact with the wall surface of the screen such that the whey is prevented from reversely flowing; and a take-out port provided in the jacket so as to allow the whey in the first chamber to overflow therethrough.

DETAILED DESCRIPTION OF THE PREFERRED EMBODIMENT

Referring to FIGS. 1 to 5, a pressing unit according to the present invention will be described, wherein the pressing unit is applied to obtain bean whey in the production of tofu.

Figure 2:
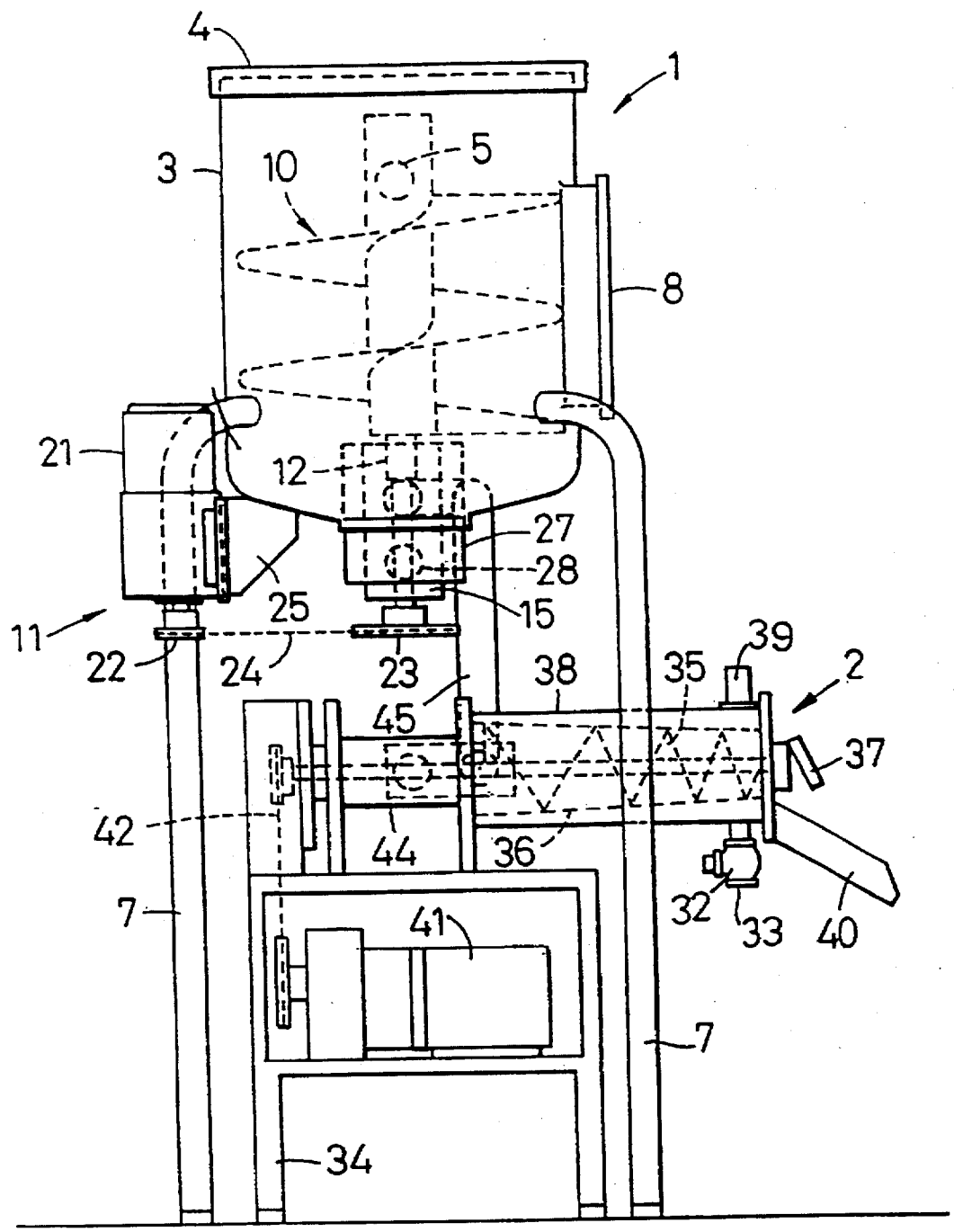
FIG. 2 is a front view showing a first embodiment of the present invention.

In FIG. 2, the exemplary pressing unit includes a steaming unit 1 and a screw-type presser 2 below the steaming unit 1.

The steaming unit 1 includes a tub 3 and a cover 4 covering the top open end of the tub 3 having an inlet port 5 in an upper part through which soybeans are introduced into the tub 3, and an outlet port 6 (FIG. 5) in the bottom through which heated soybeans are discharged. The tub 3 is provided with four supports 7 secured to the ground or any other structure. Preferably, the tub 3 is provided with a window 8 through which the inside of the tub 3 is visually watched. The tub 3, the cover 4, the ports 5 and 6 and the supports 7 are all made of stainless steel.

Figure 5:
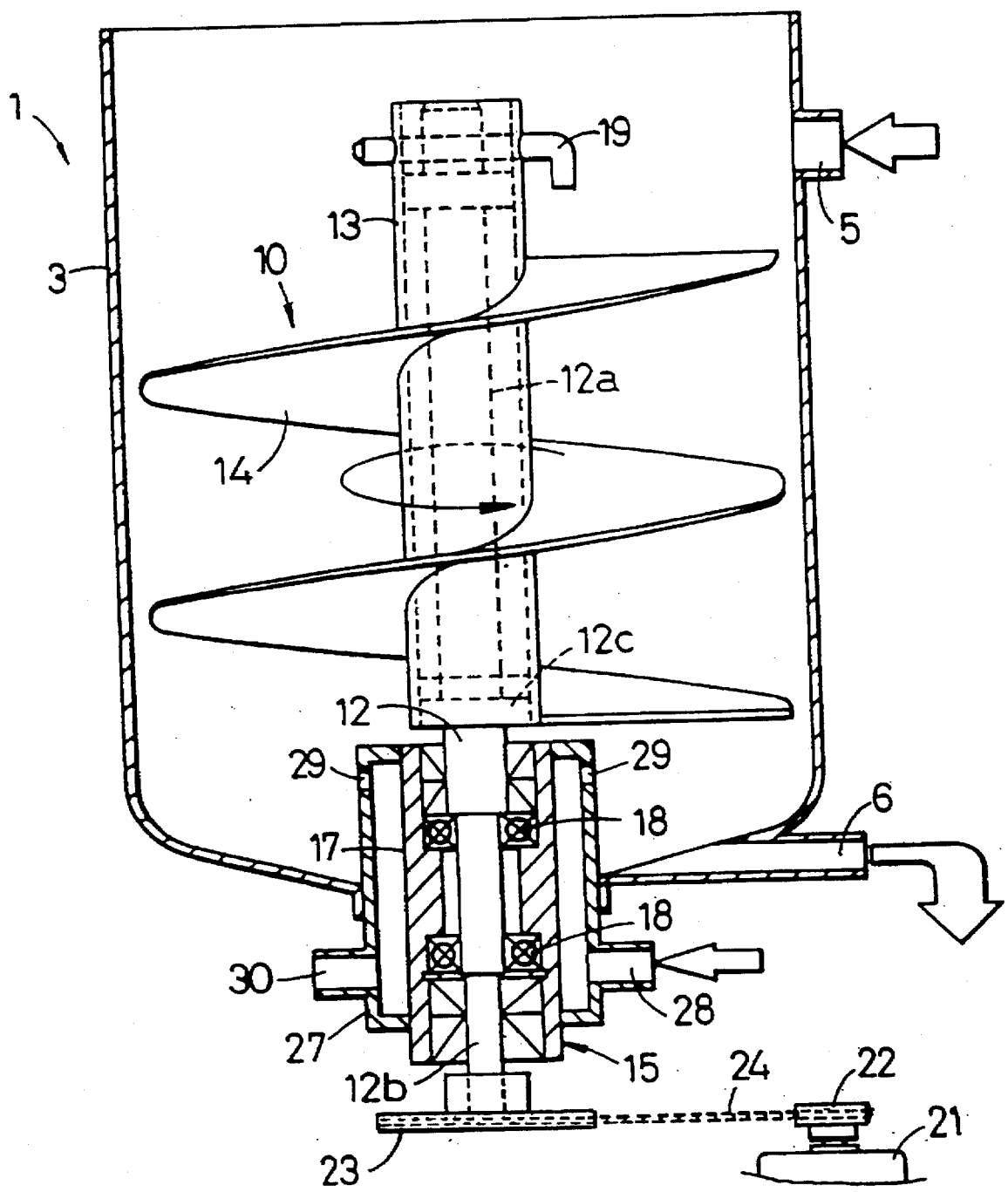
FIG. 5 is a vertical cross-section showing a steaming unit.

A power-driven agitator 10 is rotatively provided in the tub 3 so as to agitate the soybeans. The agitator 10 is driven by a driver unit 11 through a driving shaft 12. As shown in FIG. 5, the agitator 10 takes a spiral screw as a whole, which consists of a cylinder 13 fitted with blades 14 on its cylindrical surface. The tip of each blade is spaced from the inside wall of the tub 3 such a distance that the space does not allow a reverse flow of the soybeans when they are agitated. Preferably, the blades 14 are adjacent to each other at such a small pitch as to allow the soybeans to circulate slowly. The blades 14 are provided in a possibly maximum range from the inlet port 5 up to a bearing unit 15 supporting the driving shaft 12. The soybeans are introduced into the tub 3 through the inlet port 5, and are evenly agitated by the blades 14. The cylinder 13 projects beyond the uppermost blade 14.

As shown in FIG. 5, the bearing unit 15 is provided in the center of the bottom of the tub 3. The bearing unit 15 of a substantially cylindrical shape is firmly held through the bottom of the tub 3. The bearing unit 15 includes a cylindrical casing 17, two ball bearings 18 and seals. The driving shaft 12 is supported in the bearings 18 through the seals. The driving shaft 12 includes a trunk portion 12a having a relatively large diameter, and an input portion 12b held in the bottom portion of the bearing unit 15. The trunk portion 12a is secured to the cylinder 13 of the agitator 10 by means of a pin 19 passed through both of them. In this way when the shaft 12 (that is, the trunk portion 12a) is driven, it causes the cylinder 13 to rotate. The pin 19 is located at the top end of the cylinder 13 near the open end of the tub 3 so that it can be readily attached or detached. The withdrawal of the pin 19 facilitates the removal of the agitator 10 from the driving shaft 12. The driving shaft 12 also includes a flange portion 12c whereby the agitator 10 is positioned at an appropriate angle with respect to the driving shaft 12.

In FIG. 2, the driver unit 11 includes a reduction-gear equipped motor 21, a driving sprocket 22 secured to an output shaft of the motor 21, a driven sprocket 23 secured to the input shaft 12b of the driving shaft 12, and a chain 24 connecting both sprockets 22 and 23. The driver unit 11, when driven, transmits a torque to the agitator 10 through the driving shaft 12, thereby causing it to rotate at a relatively low speed, preferably at 20 to 40 rpm. The agitator 10 is rotated in a direction as indicated by the arrow in FIG. 5 such that the soybeans are urged by the blades 14 toward the bottom of the tub 3 and they are kept in contact with steam in the manner described below. In addition, the blades 14 are effective to crush the bubbles in the soybean slurry. In this way air-free soybean slurry is obtained. The motor 21 is supported by a bracket 25 secured to the outside surface of the tub 3.

The bearing unit 15 includes a cylindrical jacket 27 concentrically around the casing 17, the jacket 27 introducing steam into the tub 3 from a steam generator (not shown). The lower end of the jacket 27 is welded to the bottom portion of the tub 3, and the upper end is welded to the upper part of the casing. By closing the upper and lower portions of the jacket 27 the jacket provides a steam chamber. Steam is introduced into the jacket 27 through a steam inlet port 28 and is supplied into the tub 3 through pores 29 formed at an interval around the jacket 27. Water from the steam is drained through a drain port 30. The steam inlet port 28 and drain port 30 are provided with cocks.

As shown in FIG. 2, the pressing unit 2 is horizontally placed on a frame 34 carried on castors. The pressing unit 2 is provided with a screw 35 driven by a driving unit which is housed in the frame 34.

Figure 3:
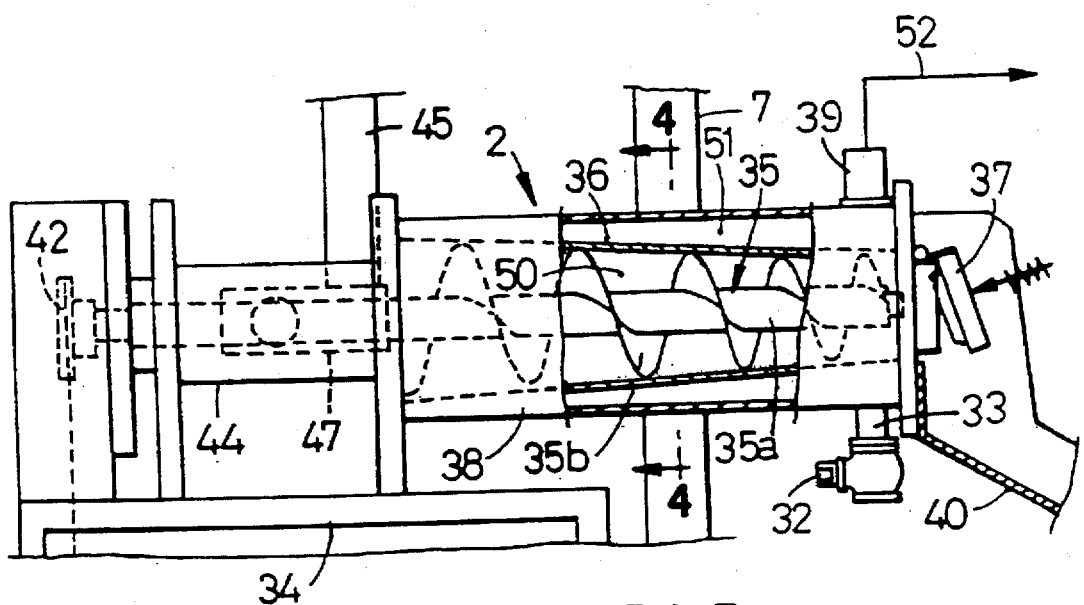
FIG. 3 is a partly broken front view of the apparatus shown in FIG. 2.

As shown in FIG. 3, in addition to the screw 35, the pressing unit 2 includes a tapered screen 36 mantling or enveloping the screw 35, and a cone-shaped adjuster 37 for regulating a pressure at which the soybean slurry is pressed. The bean whey is received by a cylindrical jacket 38. A space, hereinafter referred to as whey chamber 51 is formed between the screen 36 and the jacket 38 to be used for holding the bean whey squeezed through an inside space 50 in the screen 36. The screw 35 is provided with spiral blades 35b around a rotor 35a rotatively supported. The blades 35b are progressively reduced in their diameters toward an outlet port, and are at smaller pitches toward the outlet port.

Preferably, the tip portions of the blades 35b are covered along their full length with seals such as Tefron (Trademark). The screen 38 filters or dehydrates the bean whey. In order to dehydrate effectively, the screen 38 is made of porous steel alloy of 300 in mesh, and having a thickness of 0.05 to 0.1 mm, the pores having a diameter of 0.1 to 0.05 mm.

The seal on the tip portion of each blade is preferably made of plastics of being heat-proof, having a small coefficient of friction, and being anti-wear, preferably self-lubricant; such materials can be selected from fluororesins, polyacetal resins, and nylon. As for fluororesins, polytetrafluoroethylene, polyfluoroethylenepropylene, polychlorotrifluoroethylene, polyvinylidene fluoride, can be used. Polytetrafluoroethylene is particularly suitable when it is extruded in the form of strips. In addition, a seal made of these materials is processed to be fully compressible so that it can be elastically kept in contact with the wall surface of the screen.

Figure 1:
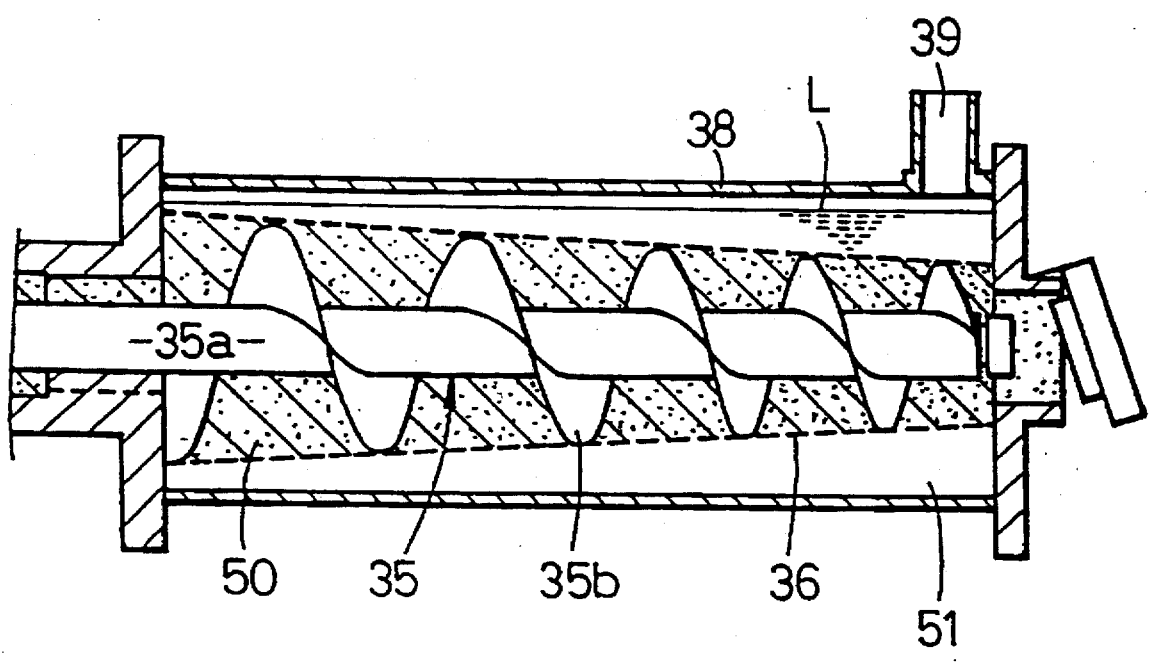
FIG. 1 is a diagrammatic view exemplifying the principle underlying the present invention.

In FIG. 1, the jacket 38 is provided with a take-out port 39 above a level L which defines the level of bean whey squeezed through the screen 36, and a drain port 33 (FIG. 3) is provided on the opposite side of the take-out port 39. The drain port 33 is closed and opened by a cock 32.

The dehydrated residue is discharged through a chute 20. As shown in FIG. 2, the driving unit includes a reduction-gear equipped motor 41, a chain 42 for transmitting the torque of the motor 41 to the screw 35, wherein a driver sprocket is connected to an output shaft of the motor 41 and a driven sprocket is connected to an end of the shaft 35a.

Figure 4:
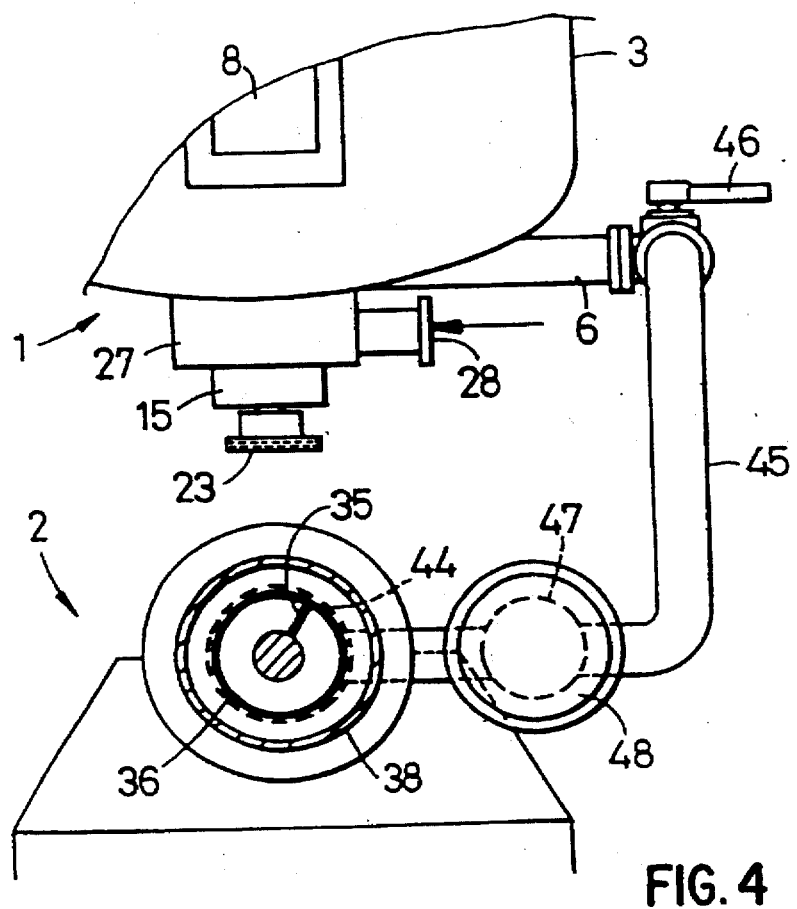
FIG. 4 is a cross-sectional view taken along the A—A line in FIG. 3.

Referring to FIG. 4, the soybeans steamed in the tub 3 are transported to the pressing unit 2 through a duct 45 of stainless steel which connects the outlet port 6 and a bearing case 44 of the pressing unit 2. The duct 45 is provided with a cock 46 and a pump 47 driven by a motor 28, wherein the cock opens and closes the duct.

For use, after the cock 46 is closed, a predetermined amount of raw soybeans are put in the tub 3 through the inlet port 5. The soybeans are pushed into the tub 3 under steam pressure. Alternatively, they can be put therein through the top end with the cover 4 removed. then, while the soybeans are agitated by the agitator 10, they are subjected to steam successively introduced through a steam port 29. Vapor is discharged through a gap around the cover 4.

The steaming continues for about an hour, and then the supply of steam is stopped, and the cock 46 is opened. Then the pump 47 and the pressing unit 2 are started. The heated soybeans are sucked by the pump 47 and transported to the bearing case 44 of the pressing unit 2 through the duct 45. Then the soybeans are pressed while being fed toward the discharge port by the screw 35.

While the soybean is being pressed by the screw 35, the drain port 33 is closed by the cock 32. The squeezed bean whey stays in the whey chamber 51 until the screen 36 is completely submerged in the bean whey. The level of the bean whey rises so as to urge air in the whey chamber 51 to be spontaneously discharged through the take-out port 39. The soybeans inside the screen 36 are pressed by the screw 35 at a state where the whey chamber 51 is filled with the bean whey. The bean whey squeezed through the screen 36 is forced into the staying bean whey in the chamber 51 like a jet stream so that the fresh bean whey becomes homogeneous with the staying bean whey. The fresh bean whey homogeneously mixes with the staying whey before it comes into collision with the wall of the jacket 38, thereby preventing bubbles from occurring. As the level of the bean whey in the chamber 51 rises, it overflows through the take-out port 39, and flows into a vessel (not shown) through a take-out duct 52. The bean whey in the vessel is transported for the next process.

When the pressing work is finished, the cock 32 is opened, and the bean whey in the chamber 51 is discharged through the drain port 33. Alternatively, the water used to clean the steaming unit 1 is sent into the pressing unit 2 so as to clean the screw 35 and the screen 36. The used water is drained through the drain port 33.

Figure 6:
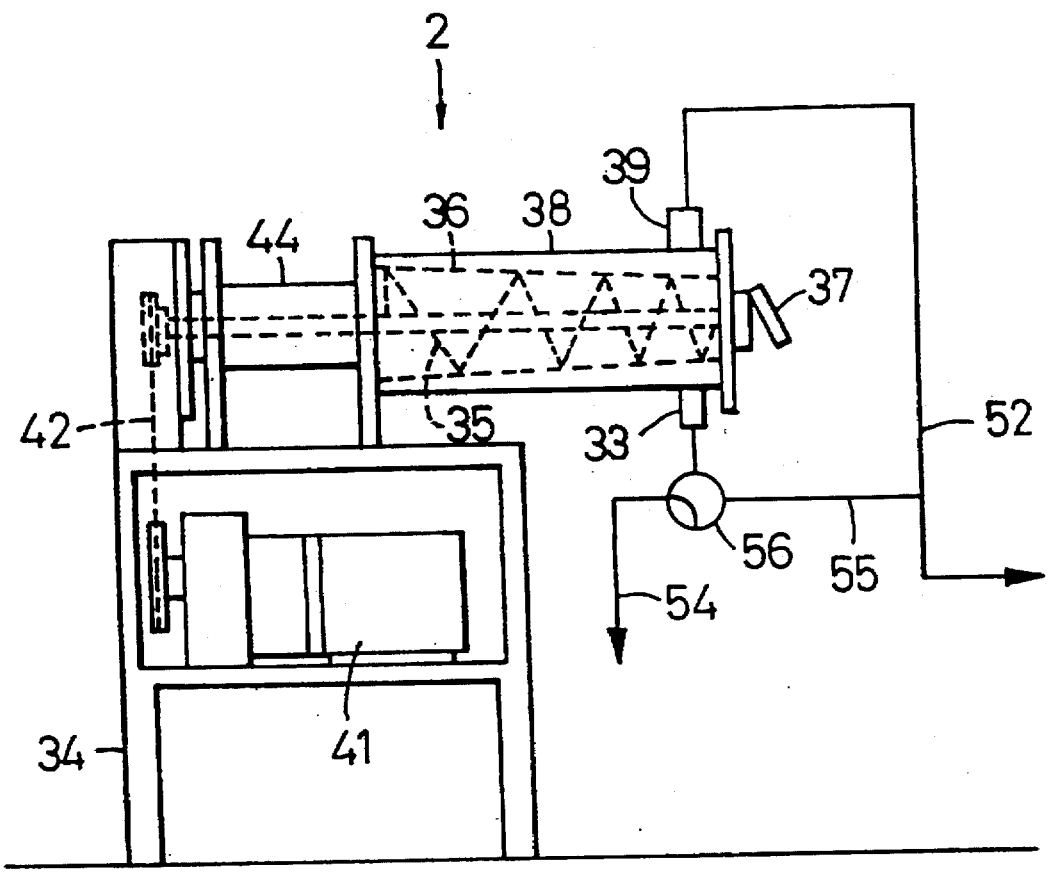
FIG. 6 is a front view showing a second embodiment of the present invention.

Referring to FIG. 6, another embodiment will be described.

This embodiment is characterized by the provision of a three-way cock 56 connected to the drain port 33, wherein the three-way cock 56 is switchably connected to a drain path 54 and a bypass 55 to the take-out duct 52. The three-way cock 56 can be switched to close the drain path 54 so as to stop the flow of the bean whey from the chamber 51 through the drain port 33, or to guide the whey into the take-out path 52 through the bypass 55. When the used cleaning water is to be discharged, the three-way cock 56 is switched so as to connect the chamber 51 with the drain path through the drain port 33. The three-way cock 56 can be substituted by two cocks, that is, a first cock provided for the drain path 54 and a second cock for the bypass 55 so that the bean whey can be distributed in either direction. The take-out port 39 can be used as a supply port through which the pressing unit 2 is to be cleaned with water. After the water fills the whey chamber 51, it is discharged through the drain port 33.

In the illustrated examples the screw 35 and the jacket 38 are horizontally supported but they can be supported at any angle including 90°. The position of the take-out port 39 is determined depending upon the angle at which the jacket 38 is supported, so as to enable the bean whey to fill the whey chamber 51. Two or more take-out ports can be provided.

In spite of any angle at which the screen 36 is supported, it is important to keep the level in the whey chamber 51 as high as to allow the screen 36 to be fully submerged under the bean whey therein.

The pressing unit 2 is self-contained, and the jacket 38 can take any form such as cylindrical or tapered.

What is claimed is:

1. An apparatus for separating whey from a slurry material such as bean and dairy products, the apparatus comprising:
    a screen for squeezing said slurry material therethrough;
    a jacket mantling the screen with a first space outside the screen and a second space inside the screen, wherein the first space provides a whey chamber of a size which allows the screen to be submerged in the whey staying therein after the whey is squeezed through the screen;
    a spiral screw rotatatively housed in the screen, the blades of the screw being kept in contact with the wall surface of the screen such that a reverse flow of the whey is prevented; and
    a take-out port provided in the jacket so as to allow the whey in the whey chamber to overflow therethrough.

2. The apparatus according to claim 1, wherein the screw has a horizontal axis, and wherein the take-out port is provided on the upper side of the jacket, the take-out port being connected to a take-out path.

3. The apparatus according to claim 1, further comprising a drain port in the underside of the jacket, the drain port being connected to a drain path, and a three-way cock switchably connectable to the drain path and the take-out path through a bypass.

4. The apparatus according to claim 2, further comprising a drain port in the underside of the jacket, the drain port being connected to a drain path, and a three-way cock switchably connectable to the drain path and the take-out path through a bypass.

5. An apparatus for separating whey from a slurry material such as bean and dairy products, the apparatus comprising:
    screen for squeezing said slurry material therethrough;
    a jacket mantling the screen with a first space outside the screen and a second space inside the screen, wherein the first space provides a whey chamber of a size which allows the screen to be submerged in the whey staying therein after the whey is squeezed through the screen;
    a spiral screw rotatatively housed in the screen, the blades of the screw being kept in contact with the wall surface of the screen such that a reverse flow of the whey is prevented; and
    a take-out port provided on an upper side of the jacket so as to allow the whey in the whey chamber to overflow therethrough.

6. The apparatus according to claim 5, further comprising a drain port in the underside of the jacket, the drain port being connected to a drain path, and a three-way cock switchably connectable to the drain path and the take-out path through a bypass.

7. An apparatus for separating whey from a slurry material such as bean and dairy products, the apparatus comprising:
    a screen for squeezing said slurry material therethrough;
    a jacket mantling the screen with a first space outside the screen and a second space inside the screen, wherein the first space provides a whey chamber of a size which allows the screen to be submerged in the whey staying therein after the whey is squeezed through the screen;
    a spiral screw rotatatively housed in the screen, the blades of the screw being kept in contact with the wall surface of the screen such that a reverse flow of the whey is prevented;
    a take-out port provided in the jacket so as to allow the whey in the whey chamber to overflow therethrough; and
    a drain port in the underside of the jacket, the drain port being connected to a drain path.

8. The apparatus according to claim 7, further comprising a three-way cock switchably connectable to the drain path and the take-out path through a bypass.

* * * * *